United States Patent
Le et al.

(10) Patent No.: US 10,985,453 B2
(45) Date of Patent: *Apr. 20, 2021

(54) LOW PROFILE HIGH PERFORMANCE INTEGRATED ANTENNA FOR SMALL CELL BASE STATION

(71) Applicant: Intel Corporation, Santa Clara, CA (US)

(72) Inventors: Kevin Le, Los Angeles, CA (US); Anthony Teillet, Trabuco Canyon, CA (US); Scott Carichner, Los Angeles, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,550

(22) Filed: Jun. 6, 2019

(65) Prior Publication Data

US 2020/0091598 A1    Mar. 19, 2020

Related U.S. Application Data

(63) Continuation of application No. 14/768,115, filed as application No. PCT/IB2014/001369 on Mar. 12, 2014, now Pat. No. 10,333,210.
(Continued)

(51) Int. Cl.
*H01Q 1/40*      (2006.01)
*H01Q 1/24*      (2006.01)
(Continued)

(52) U.S. Cl.
CPC .......... *H01Q 1/405* (2013.01); *H01Q 1/246* (2013.01); *H01Q 1/42* (2013.01); *H01Q 9/0407* (2013.01);
(Continued)

(58) Field of Classification Search
None
See application file for complete search history.

(56) References Cited

U.S. PATENT DOCUMENTS 10,333,210 B2    6/2019   Le et al.
2001/0054983 A1   12/2001   Judd et al.
(Continued)

FOREIGN PATENT DOCUMENTS

CN        105144475 A    12/2015
EP         0892461 A1     1/1999
(Continued)

OTHER PUBLICATIONS

U.S. Appl. No. 14/768,115 U.S. Pat. No. 10,333,210, filed Aug. 14, 2015, Low Profile High Performance Integrated Antenna for Small Cell Base Station.
(Continued)

*Primary Examiner* — Saumit Shah
(74) *Attorney, Agent, or Firm* — Schwegman Lundberg & Woessner, P.A.

(57) ABSTRACT

The present disclosure relates to antenna design for installation on small cell base stations. The antenna design corresponds to a conformal antenna design that fits into a traditional sun-shield of an outdoor base station. In another aspect, the antenna design supports multiple bands and multiple technologies. In a further aspect, the antenna design provides a gain pattern that allows installation of the small cells into directional sectors to further enhance the spectral efficiency while providing a single installation location. In still a further aspect, the design permits the form factor of the base station to meet unique and desirable aesthetic principals such as a modern curved surface and an attractive and distinctive height, width and depth ratio.

19 Claims, 6 Drawing Sheets

Related U.S. Application Data

(60) Provisional application No. 61/794,681, filed on Mar. 15, 2013.

(51) Int. Cl.
  *H01Q 1/42* (2006.01)
  *H01Q 9/04* (2006.01)
  *H01Q 21/24* (2006.01)
  H04W 84/12 (2009.01)
  H04W 88/10 (2009.01)

(52) U.S. Cl.
  CPC ............ *H01Q 21/24* (2013.01); *H04W 84/12* (2013.01); *H04W 88/10* (2013.01)

(56) References Cited

U.S. PATENT DOCUMENTS

| | | | |
|---|---|---|---|
| 2007/0228211 A1 | 10/2007 | Facciano et al. | |
| 2008/0055183 A1 | 3/2008 | Yuba et al. | |
| 2012/0046001 A1* | 2/2012 | Inoue | H01Q 3/26 455/73 |
| 2012/0056787 A1 | 3/2012 | Tatarnikov et al. | |
| 2013/0195106 A1* | 8/2013 | Calmon | H04L 69/14 370/389 |
| 2013/0272217 A1* | 10/2013 | Negus | H04L 5/14 370/329 |
| 2014/0218255 A1* | 8/2014 | Sanford | H01Q 19/134 343/837 |
| 2014/0239427 A1* | 8/2014 | Huang | H01L 21/486 257/428 |
| 2014/0266917 A1* | 9/2014 | De Luis | H01Q 1/38 343/700 MS |
| 2015/0372376 A1 | 12/2015 | Le et al. | |

FOREIGN PATENT DOCUMENTS

| | | |
|---|---|---|
| KR | 1020120104839 A | 9/2012 |
| WO | WO-2014177930 A2 | 11/2014 |
| WO | WO-2014177930 A3 | 11/2014 |

OTHER PUBLICATIONS

"U.S. Appl. No. 14/768,115, Non Final Office Action dated Oct. 16, 2018", 12 pgs.

"U.S. Appl. No. 14/768,115, Notice of Allowance dated Feb. 21, 2019", 9 pgs.

"U.S. Appl. No. 14/768,115, Preliminary Amendment dated Aug. 13, 2015", 8 pgs.

"U.S. Appl. No. 14/768,115, Response filed 01-16-19 to Non Final Office Action dated Oct. 16, 2016", 9 pgs.

"U.S. Appl. No. 14/768,115, Response filed 10-01-18 to Restriction Requirement dated Jul. 31, 2018", 8 pgs.

"U.S. Appl. No. 14/768,115, Restriction Requirement dated Jul. 31, 2018", 7 pgs.

"Chinese Application Serial No. 201480008203.3, Office Action dated Jan. 4, 2017", w/English Translation, 12 pgs.

"Chinese Application Serial No. 201480008203.3, Office Action dated Feb. 13, 2018", 8 pgs.

"Chinese Application Serial No. 201480008203.3, Office Action dated Aug. 31, 2017", 6 pgs.

"Chinese Application Serial No. 201480008203.3, Response filed Apr. 27, 2018 to Office Action dated Feb. 13, 2018", W/ English Claims, 12 pgs.

"Chinese Application Serial No. 201480008203.3, Response Filed May 19, 2017 to Office Action dated Jan. 4, 2017", (N/ English Claims), 13 pgs.

"Chinese Application Serial No. 201480008203.3, Response Filed Nov. 15, 2017 to Office Action dated Aug. 31, 2017", (W/ English Claims), 16 pgs.

"European Application Serial No. 14780548.5, Response filed May 2, 2016 to Communication pursuant to Rules 161(1) and 162 EPC dated Oct. 23, 2015", 12 pgs.

"International Application Serial No. PCT/IB2014/001369, International Preliminary Report on Patentability dated Sep. 24, 2015", 8 pgs.

"International Application Serial No. PCT/IB2014/001369, International Search Report dated Dec. 8, 2014", 3 pgs.

"International Application Serial No. PCT/IB2014/001369, Written Opinion dated Dec. 8, 2014", 6 pgs.

\* cited by examiner

US 10,985,453 B2

LOW PROFILE HIGH PERFORMANCE INTEGRATED ANTENNA FOR SMALL CELL BASE STATION

BACKGROUND

Small cell base stations typically correspond to single sector stand-alone base stations housed in a single enclosure. Small cell base stations convert internet protocol backhaul communications links into RF transmit signals and converts RF receive signals into internet protocol backhaul communications links. Small cell base stations often support multiple air interface technologies and enable high capacity data throughput over a generally smaller coverage area relative to other infrastructure equipment. For example, the coverage area of a small cell can have a range of less than 500 meters.

SUMMARY OF THE INVENTION

The present invention provides an antenna assembly for use in a small cell base station, the antenna assembly comprising a housing having an exterior and an interior with an interior shape a dielectric material within the housing and conforming to the interior shape of the housing, a plurality of antenna patches positioned between the housing and the dielectric material and electric field polarizations for exciting each of the plurality of antenna radiator patches. The housing may be a radome, which may function in part as a solar shield. The radome may be a curved radome. Each of the plurality of antenna patches may be located in thin pockets of the dielectric material. The plurality of antenna patches includes resonating and radiating patches, comprising a first pair of elements for receiving in a frequency bank for an LTE signal, a second pair of elements for transmitting in a frequency band for an LTE signal and a third pair of elements for operation in a Wi-Fi signal frequency band. Each of the pairs of elements has a similar cross-polarization scheme and a similar gain pattern in vertical and azimuth directions. The antenna assembly may be located in a small base station having cooling fins, wherein the cooling fins are removed behind the plurality of antenna patches.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompany drawings.

DETAILED DESCRIPTION OF THE INVENTION

Generally described, the present disclosure relates to antenna design for installation on small cell base stations. In one aspect, the antenna design corresponds to a conformal antenna design that fits into a traditional sun-shield of an outdoor base station Dimensions of one aspect of small cell base station are 575 mm height, 225 mm wide, 85 mm deep. In another aspect, the antenna design supports multiple bands and multiple technologies. Such an antenna design may be capable of extending the bandwidth beyond what is usually possible with patch antennas. In a further aspect, the antenna design provides a gain pattern that allows installation of the small cells into directional sections to further enhance the spectral efficiency while providing a single installation location. In still a further aspect, design permits the form factor of the base station to meet unique and desirable aesthetic principles such as a modern curved surface and an attractive and distinctive height, width and depth ratio.

One skilled in the relevant art will appreciate that the disclosed embodiments and examples are illustrative in nature. Accordingly, the disclosed embodiments and examples should not be construed as limiting. Additionally, although various aspects of the present disclosure have been identified and may be described together, the present disclosure is not limited to embodiments in which all the identified aspects must be considered or combination of any described aspects should be required.

Figure 1:
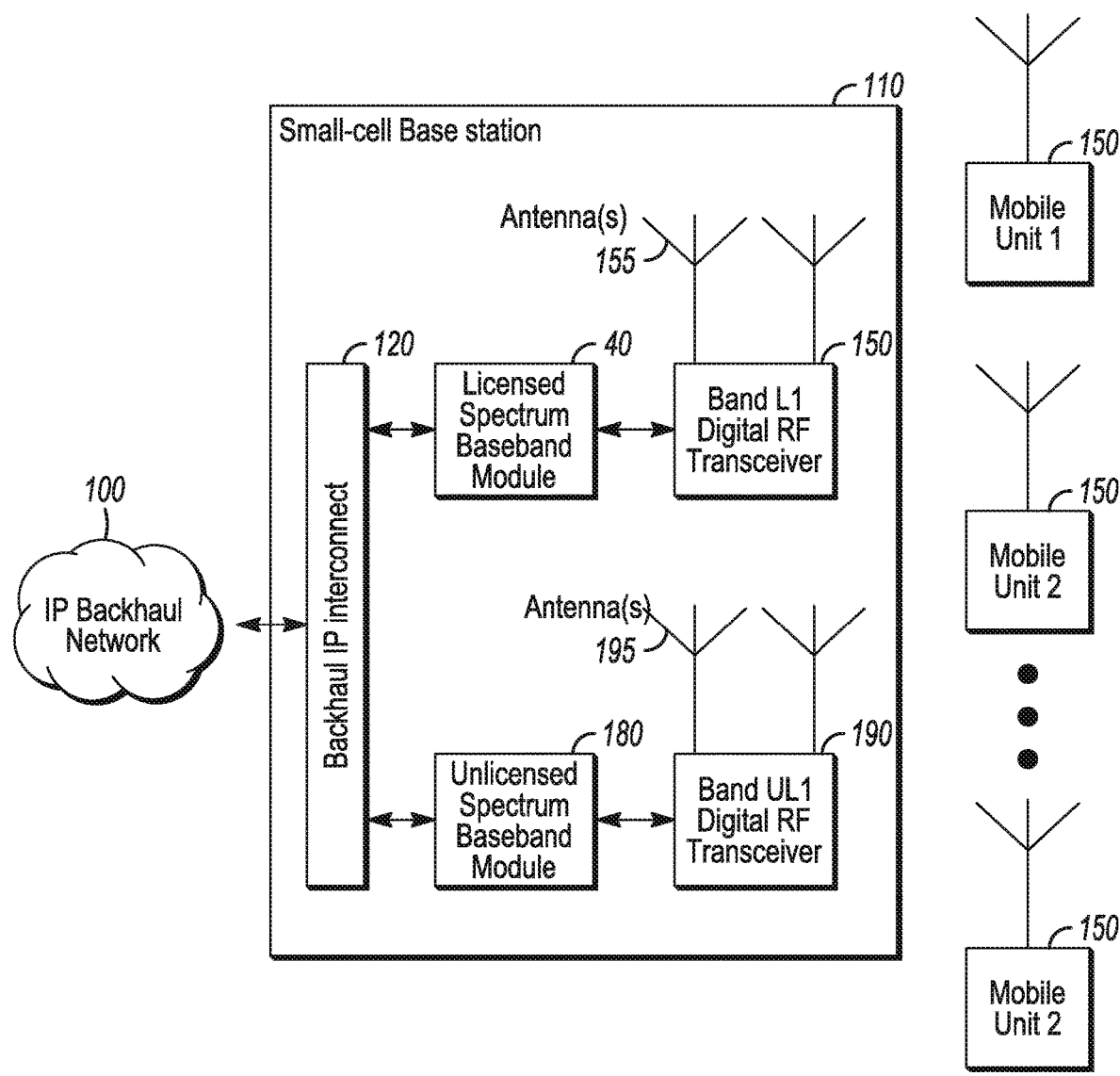
FIG. 1 is a block diagram of the small cell base station.

FIG. 1 is a block diagram of a small cell base station (110) or "small cell." A small cell base station is used to provide additional data throughput to mobile units (150) by means of heterogeneous networks where the small cell may have overlapping coverage with one or more larger across base stations in the heterogeneous network. Additionally, small cell base stations may be configured to provide coverage of a dense area of users, often referred to as a hot spot. In an embodiment, a small cell base station may be configured to implement, or otherwise support, multiple radio access networks or air interface technologies within a single unit. For example, a small cell may be configured to implement one or more air interface standards promulgated by standards-based organizations, such as 3GPP and 3GPP2 (i.e., 1×RTT, EVDO, WCDMA, HSPA, LTE, LTE-A, WiMAX, and the like). Air interface standards and methodologies that use spectrum requiring a governmental agency license which provides exclusive use of that spectrum, such as the above described example, are generally referred to as unlicensed technologies.

The illustrative small cell base station implements an IP backhaul component to provide communication to the core network. The IP backhaul component may incorporate either a wired Ethernet connection (copper or optic fiber) or a wireless backhaul (microwave or Wi-Fi). With continued reference to FIG. 1, because of the compact size and the need to mount the base station in discreet and an aesthetically pleasing manner, it is advantageous to provide integrated antennas (155, 195) within the housing that are not conspicuous but also provide superior performance.

Figure 2:
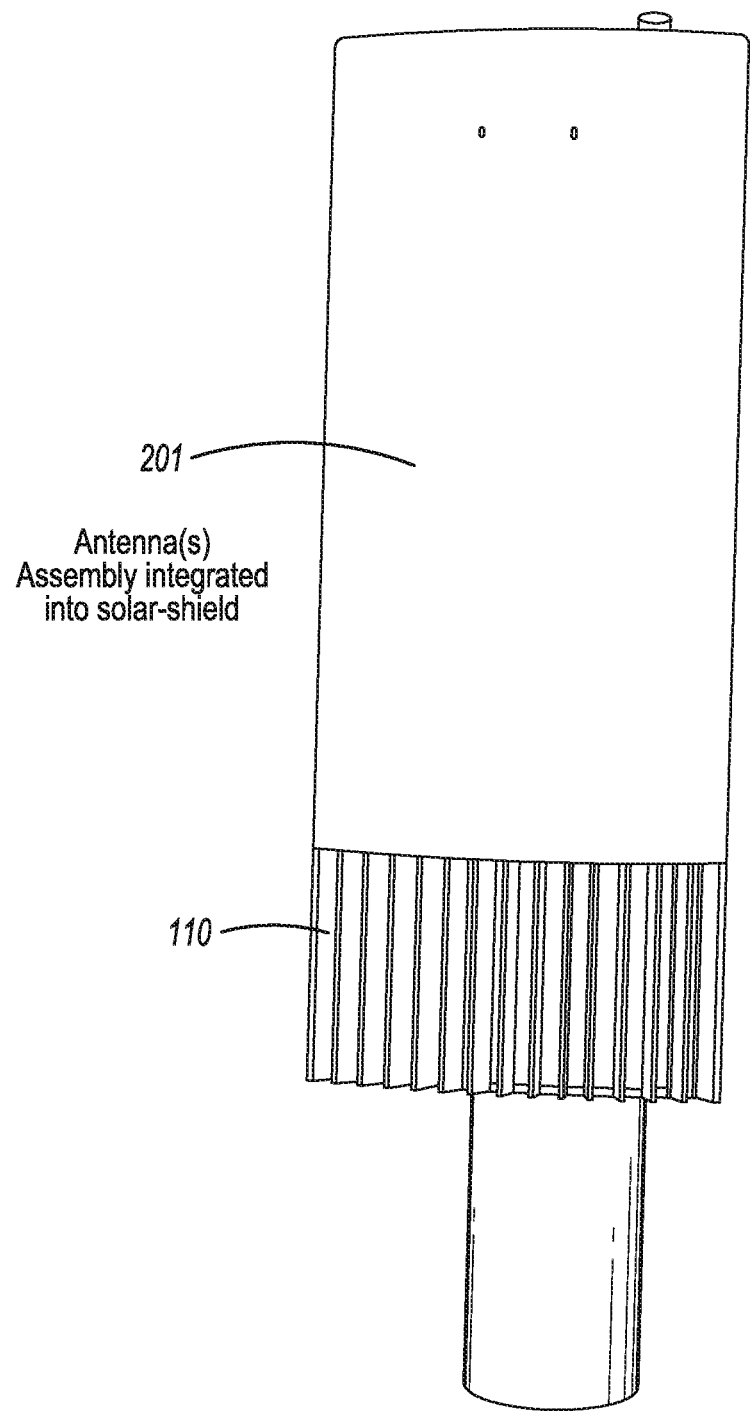
FIG. 2 illustrates an embodiment of an antenna assembly for utilization in a small cell base station.

FIG. 2 illustrates an embodiment of an antenna assembly for utilization in a small cell base station. As illustrated in FIG. 2, the antenna assembly (201) is mounted in a low-profile radome. The radome can be an inherent part of the look and feel of the small cell base station (110). In this example the base station is mounted on a pole (210) which could be a utility pole or part of a building structure. Additionally, the antenna radome in this embodiment functions as a solar shield to lower the temperature of the metal heat sink when it is exposed to direct sunlight.

Figure 3:
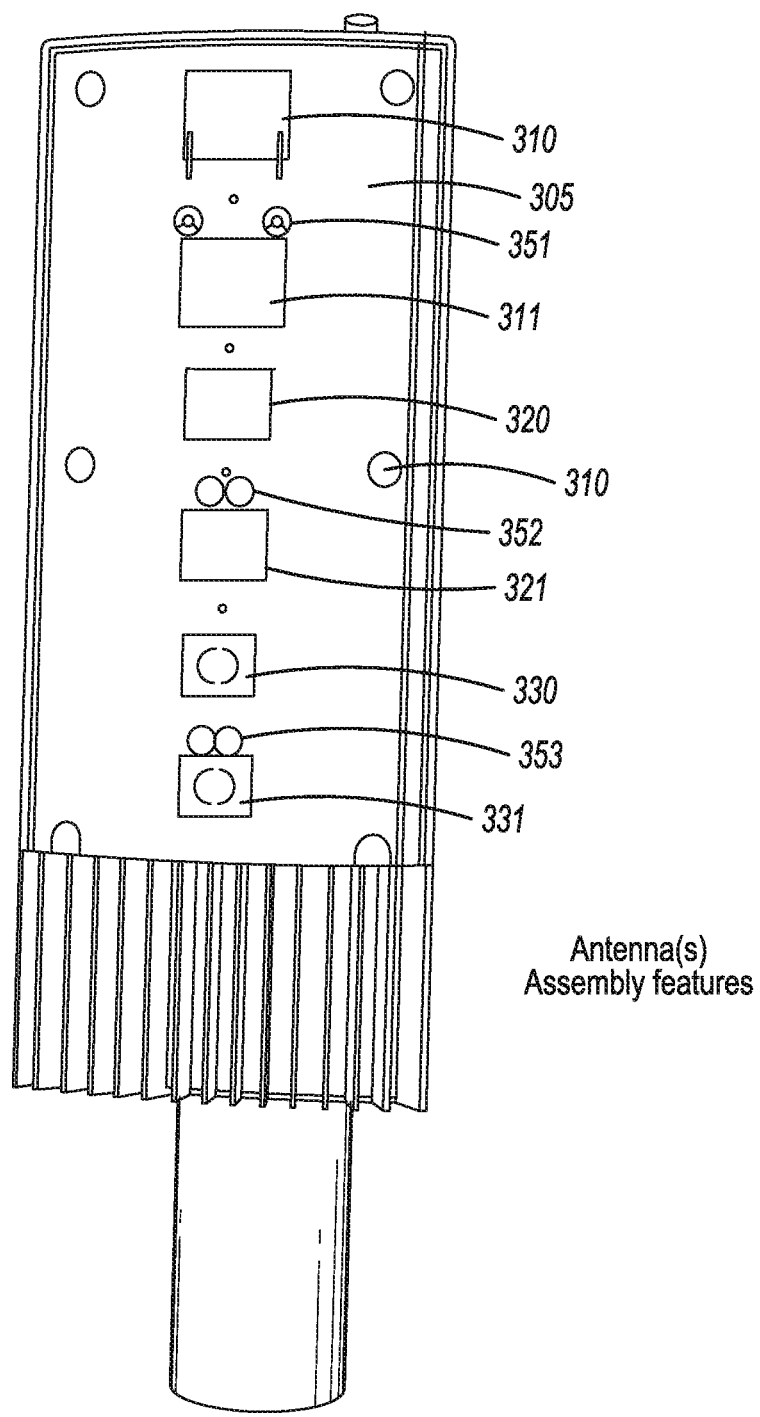
FIG. 3 is an embodiment of the antenna assembly of FIG. 2. illustrating components of the antenna assembly based on removal of an external radome.

FIG. 3 is an embodiment of the antenna assembly of FIG. 2 illustrating components of the antenna assembly. More specifically, FIG. 3 illustrates the configuration of various components as would be visible if an external radome were removed. The curved radome, shaped to meet the aesthetic requirements of the design, covers a dielectric material (305) with the same curved radius and which is connected to the curved radome using connectors (312). As illustrated in FIG. 3, in between the radome and the dielectric numeral spacer are antenna radiator patches. Illustratively, the antenna radiator patches are configured to fit into thin pockets in the dielectric material which hold the patches in the correct location. Dielectric thickness varies based on particular frequency and bandwidth. However, in this case the dielectric material is about 9 mm thick for the 700 MHz band and 4 mm thick for the 2100 MHz band. This is the spacing between the aperture in the printed circuit material and the radiating patch. A small pocket with the thickness of 0.5 mm is cut out to hold the patch (typically 0.3 mm thick) in place. The patches themselves tend to be rectangular and of the order of one half wavelength of the radiating frequency given the effective dielectric constant of the surrounding material. The conductive patches are excited through apertures from the opposite side with 2 orthogonal electric, field polarizations for each patch. Based on the configuration, each patch serves as an army element for 2 orthogonal antenna feeds.

In accordance with one aspect of an embodiment of the present disclosure, the receive frequency band for an LTE signal (1710-1755 MHz) is arrayed with two elements, (310) and (311). This provides array gain in the vertical direction while maintaining a desirable 70 degree azimuth beamwidth. The 70 degree azimuth beamwidth provides a convenient beam to support 3 sectors by placing 3 base stations at a single location aimed in approximately 120 degrees from each other in a circle. In another aspect, the transmit frequency band for an LTE signal (2110-2155 MHz) is arrayed with two elements (320) and (321). In a further aspect, a Wi-Fi signal frequency band (unlicensed spectrum at 2.4 GHz and 5 GHz) is arrayed with element (330) and (331).

In another embodiment of the invention, the unlicensed spectrum antenna elements are dual band. They resonate in both the 2.4 GHz and the 5 GHz unlicensed bands using a modified patch with 2 semi-circular slots cut out (330, 331). Notice that each technology as a similar cross-polarization scheme (+45 degrees and −45 degrees), and a similar gain pattern in both the vertical and azimuth directions. This supports an advantage of maintaining similar coverage patterns for multiple air interface technologies in the base station so that the coverage can be met easily with as few units as possible and in an efficient manner for each technology. The cross polarization for each antenna supports 2 transmit and 2 receive paths for each technology that can be used for multiple techniques such as 2×2 MIMO spatial multiplexing, transmit or receive diversity, ore transmit and/or receive beamforming according to the capabilities and standard practices used in each of the supported air interface technologies.

Figure 4:
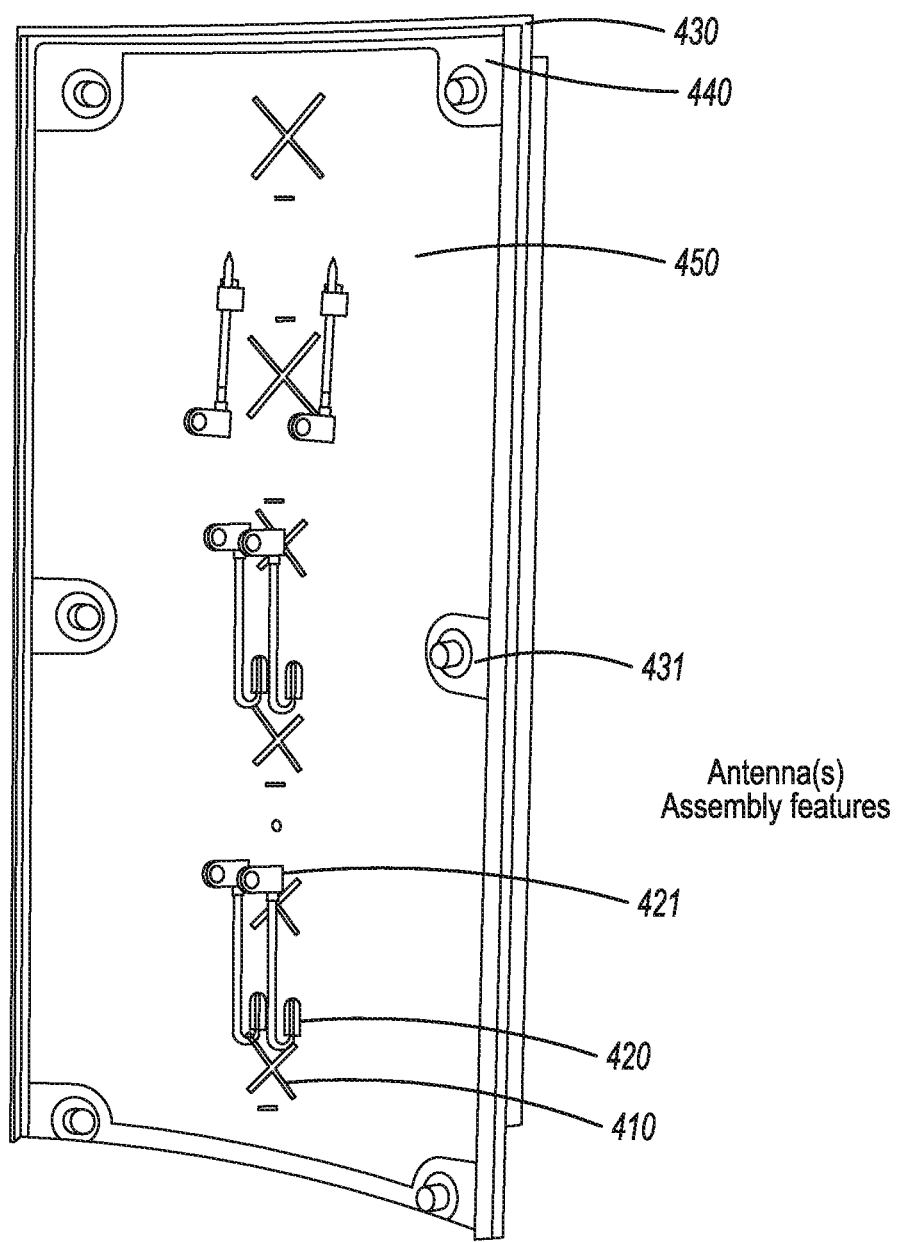
FIG. 4 is an embodiment of the antenna assembly of FIG. 2 illustrating a reverse side of the antenna assembly.

FIG. 4 is an embodiment of the antenna assembly of FIG. 2 illustrating a reverse side of the antenna assembly. Illustratively, FIG. 4 illustrates a perspective in a portion of the antenna assembly that faces inwards towards the metal housing. As illustrated in FIG. 4, the antenna assembly includes a radome, such as plastic radome (430), that functions, at lease in part, as a solar shield, environmental protections for the antenna, and a low-loss RF invisible window for the antenna. The radome may also function as a mechanical mounting point. In an aspect of the design the antenna layers are built up structurally from the radome and the radome itself contains the points to which mechanical fasteners connect the entire assembly to the metal housing of the base station.

With continued reference to FIG. 4, a dielectric sheet (431, 440) that acts as a precision mechanical spacer between the RF resonating and radiating patches, shown in FIG. 3 (310, 311, 320, 321, 330, and 331), and the double-sided printed circuit board (450) of low-loss microwave dielectric material containing a copper ground plane with slots (410) on one side and copper microstrip feed lines on the other side. Illustratively, exposed copper portions may be covered with a solder mask except the locations where the cable connections (420) are soldered to the board. The solder-mask facilitates moisture, protection for the antenna feeds. A coaxial cable is connected to connectors (421) of the cable connections (420) and the junction coated with waterproofing material such as silicone. The coaxial cable and microwave connector permit the antenna to be used or disconnected so that an alternate external coaxial cable leading to an alternate antenna can he connected to the base station if desired. In that situation the integrated antenna is left in place, disconnected, and continues to serve as a solar shield and aesthetic component of the design.

Figure 5:
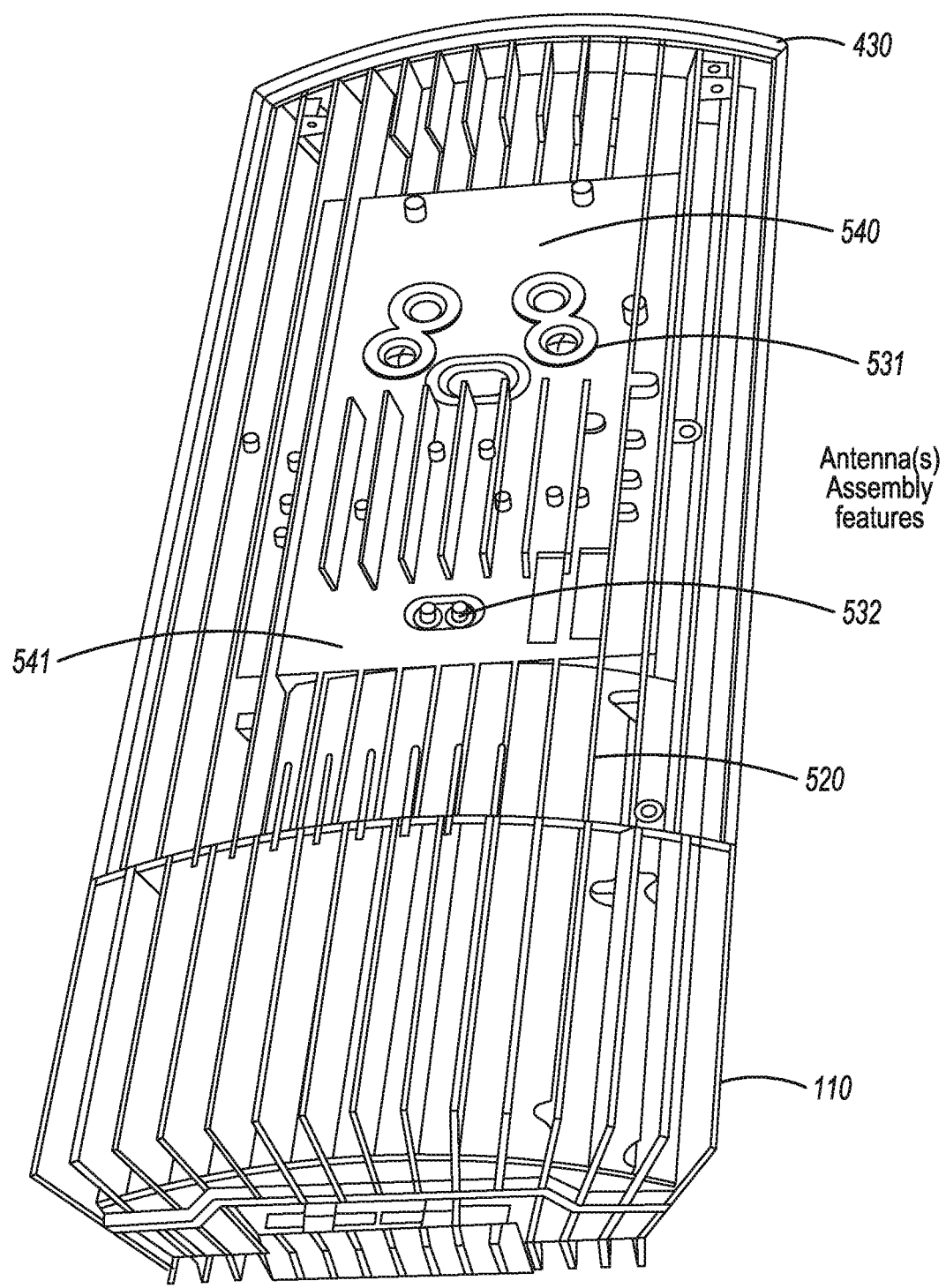
FIG. 5 illustrates an embodiment of small cell base station features to mate with and utilize an antenna assembly.

FIG. 5 illustrates an embodiment of small cell base station features to mate with and utilize an antenna assembly (430). Illustrative, the antenna assembly (430) may be shown as substantially transparent to visualize at least a portion of housing structure underneath. In one embodiment, the aluminum cooling fins (520) for the base station (110) are removed in the areas directly behind the apertures that teed each of the radiating patches. Such a configuration may enhance the antenna radiation pattern, improve the radiation efficiency, reduce the antenna gain in the reverse direction, and provide cross-polar discrimination necessary for multiple antenna performance. With continued reference to FIG. 5, the waterproof connectors (532) in the housing provide direct and low-loss RF connection between the base station and the integrated antennas while permitting protection of the active electronics inside the base station from environmental conditions.

Figure 6A:
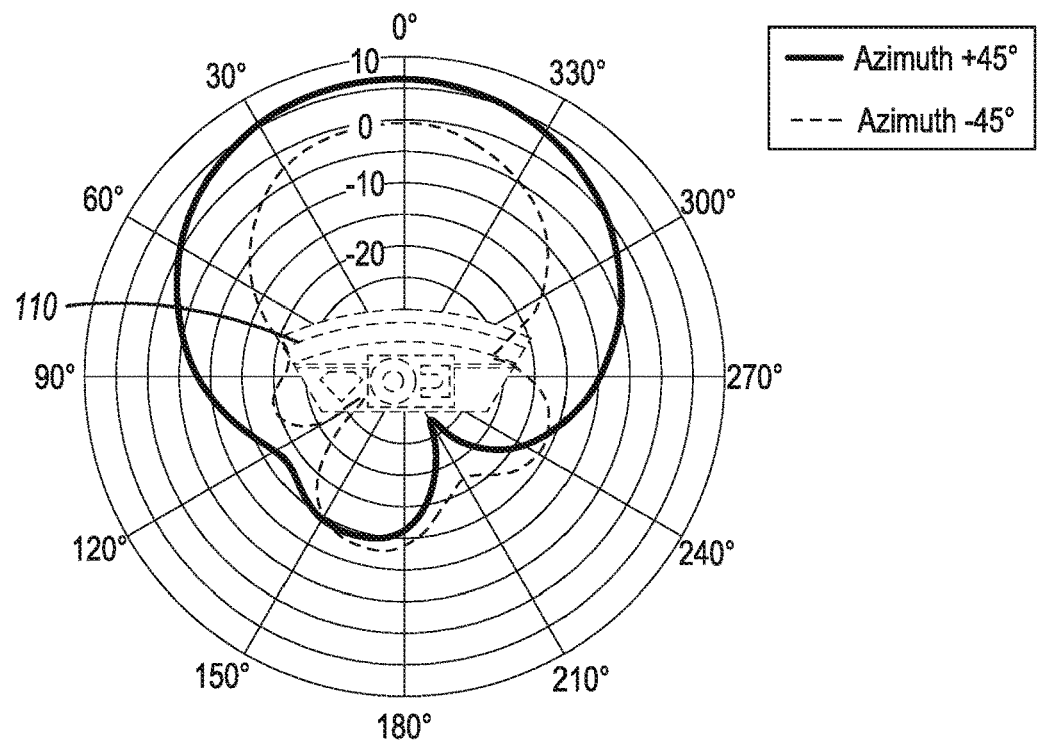
FIG. 6A illustrates an Azimuth RE radiation pattern and orientation illustrative of usage of an antenna assembly.
Figure 6B:
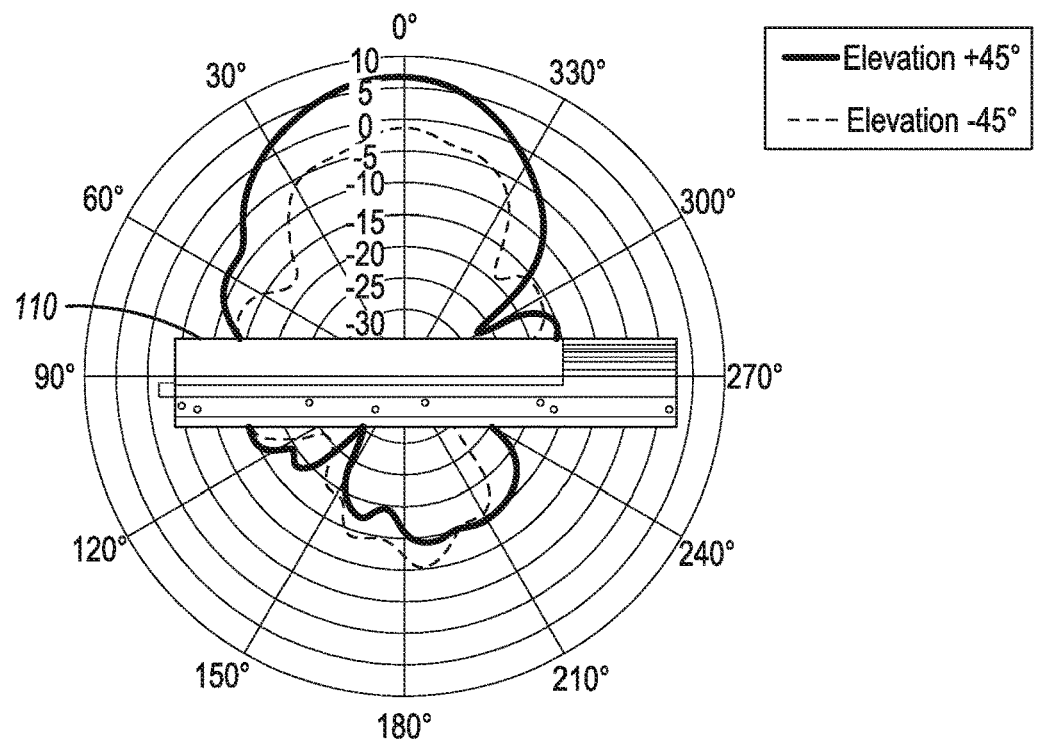
FIG. 6B illustrates an Elevation RF radiation pattern and orientation illustrative of usage of an antenna assembly.

FIG. 6 illustrates RE radiation patterns illustrative of usage of an antenna assembly. As illustrated in FIG. 6, the azimuth pattern is shown with a representation of the base station (110) shown in the orientation in which the pattern is taken relative to the base station. The pattern is shown for the +45° polarization. In which case the +45° port shows high efficiency and gain while the −45° port shows the isolation of XPD (cross-polar discrimination) which preferably has a very small response. In this case, a response that is lower by 10-15 dB provides sufficient isolation or decorrelation between the two polarizations so that it is a small and insignificant proportion of the total correlation between the polarizations. External sources of coupling between the polarizations, including the RF channel propagation model and the handset antenna performance, will tend to provide at least −10 dB of correlation and will dominate the base station antenna performance shown in FIG. 6.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into the memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An antenna assembly comprising:
a curved radome configured for outdoor use;
a plurality of antenna patches provided within the curved radome, the radome functioning as a mechanical mounting point for the antenna patches, each antenna patch configured to serve as an array element for two orthogonal antenna feeds and to be excited with two orthogonal field polarizations, different pairs of the antenna patches having dimensions for communication in different frequency bands;
a sheet of dielectric material within the curved radome, the dielectric material conforming with an interior shape of the curved radome; and
a ground plane disposed on the dielectric material, the ground plane having a plurality of pairs of orthogonal slots formed therein, each pair of orthogonal slots opposing a different one of the antenna patches, a length of each pair of slots dependent on the dimensions of the opposing antenna patch.

2. The antenna assembly of claim 1 wherein the pairs of antenna patches are configured for 2×2 multiple-input and multiple-output (MIMO) spatial multiplexing.

3. The antenna assembly of claim 1 wherein the pairs of patches are configured to communicate using different IEEE 802.11 standards.

4. The antenna assembly of claim 3 wherein the pairs of patches are configured to support IEEE 802.11a, 802.11 b/g, 802.11ac and 802.11 n in a 2.4 GHz and a 5 GHz frequency band.

5. The antenna assembly of claim 1 wherein the antenna assembly is part of a heterogeneous mesh network.

6. The antenna assembly of claim 1 wherein the pairs of patches are adjacent to a surface of the radome.

7. The antenna assembly of claim 1 wherein the antenna patches are retained in thin pockets of the dielectric material.

8. The antenna assembly of claim 7 wherein:
the thin pockets are cutouts in the dielectric material,
the thin pockets are configured to hold the antenna patches in predetermined positions, and
the antenna patches are excited through apertures within the dielectric material from a side opposite the radome.

9. The antenna assembly of claim 8 wherein a thickness of the dielectric material in each pocket varies based on a frequency and bandwidth to be emitted by the patch in the pocket.

10. The antenna assembly of claim 1 wherein the dielectric material is configured to serve as a precision mechanical spacer between the patches of each pair of antenna patches.

11. The antenna assembly of claim 1 further comprising cooling fins vertically adjacent to the radome behind apertures through which the antenna patches are excited, the cooling fins removable from a side opposite the radome.

12. The antenna assembly of claim 1 wherein each pair of patches has a similar cross-polarization scheme and a similar gain pattern in vertical and azimuth directions.

13. The antenna assembly of claim 1 further comprising:
licensed spectrum circuitry to support communications in accordance with a cellular air interface;
unlicensed spectrum circuitry to support communications in accordance with an unlicensed air interface; and
a backhaul internet protocol (IP) interconnect coupled with both the licensed spectrum circuitry and unlicensed spectrum circuitry, the backhaul IP interconnect configured for communicating with a backhaul network.

14. An antenna assembly comprising:
a curved radome configured for outdoor use;
a plurality of antenna patches provided within the curved radome, the radome functioning as a mechanical mounting point for the antenna patches, each antenna patch configured to serve as an array element for two orthogonal antenna feeds and to be excited with two orthogonal field polarizations, different pairs of the antenna patches having dimensions for communication in different frequency bands;
a sheet of dielectric material within the curved radome, the dielectric material conforming with an interior shape of the curved radome; and
a ground plane disposed on the dielectric material, the ground plane having a plurality of pairs of orthogonal slots formed therein, each pair of orthogonal slots opposing a different one of the antenna patches, a length of each pair of slots dependent on the dimensions of the opposing antenna patch; and
a backhaul IP interconnect configured to be coupled with unlicensed spectrum circuitry, the backhaul IP interconnect configured for communicating with a backhaul network.

15. The antenna assembly of claim 14 further comprising the unlicensed spectrum circuitry, which is disposed within the radome to support communications of the pairs of antenna patches in accordance with an unlicensed air interface.

16. The antenna assembly of claim 14 wherein the pairs of patches are configured for 2×2 multiple-input and multiple-output (MIMO) spatial multiplexing and to support IEEE 802.11a, 802.11 b/g, 802.11 ac and 802.11 n in a 2.4 GHz and a 5 GHz frequency band.

17. The antenna assembly of claim 14 wherein the pairs of patches are adjacent to a surface of the radome.

18. The antenna assembly of claim 14
wherein
the antenna patches are retained in thin pockets of the dielectric material, and
a thickness of the dielectric material in each pocket varies based on a frequency and bandwidth to be emitted by the patch in the pocket.

19. The antenna assembly of claim 14 further comprising cooling fins within the radome behind apertures through which the antenna patches are excited, the cooling fins removable from a side opposite the radome.

\* \* \* \* \*

UNITED STATES PATENT AND TRADEMARK OFFICE
CERTIFICATE OF CORRECTION

PATENT NO. : 10,985,453 B2  
APPLICATION NO. : 16/433550  
DATED : April 20, 2021  
INVENTOR(S) : Le et al.

Page 1 of 1

It is certified that error appears in the above-identified patent and that said Letters Patent is hereby corrected as shown below:

On the Title Page

On page 2, in Column 2, under "Other Publications", Line 8, delete "2016"," and insert --2018",-- therefor Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*